No. 881,572. PATENTED MAR. 10, 1908.
H. E. GOLDBERG.
CALCULATING MACHINE.
APPLICATION FILED JUNE 5, 1907.
4 SHEETS—SHEET 2.
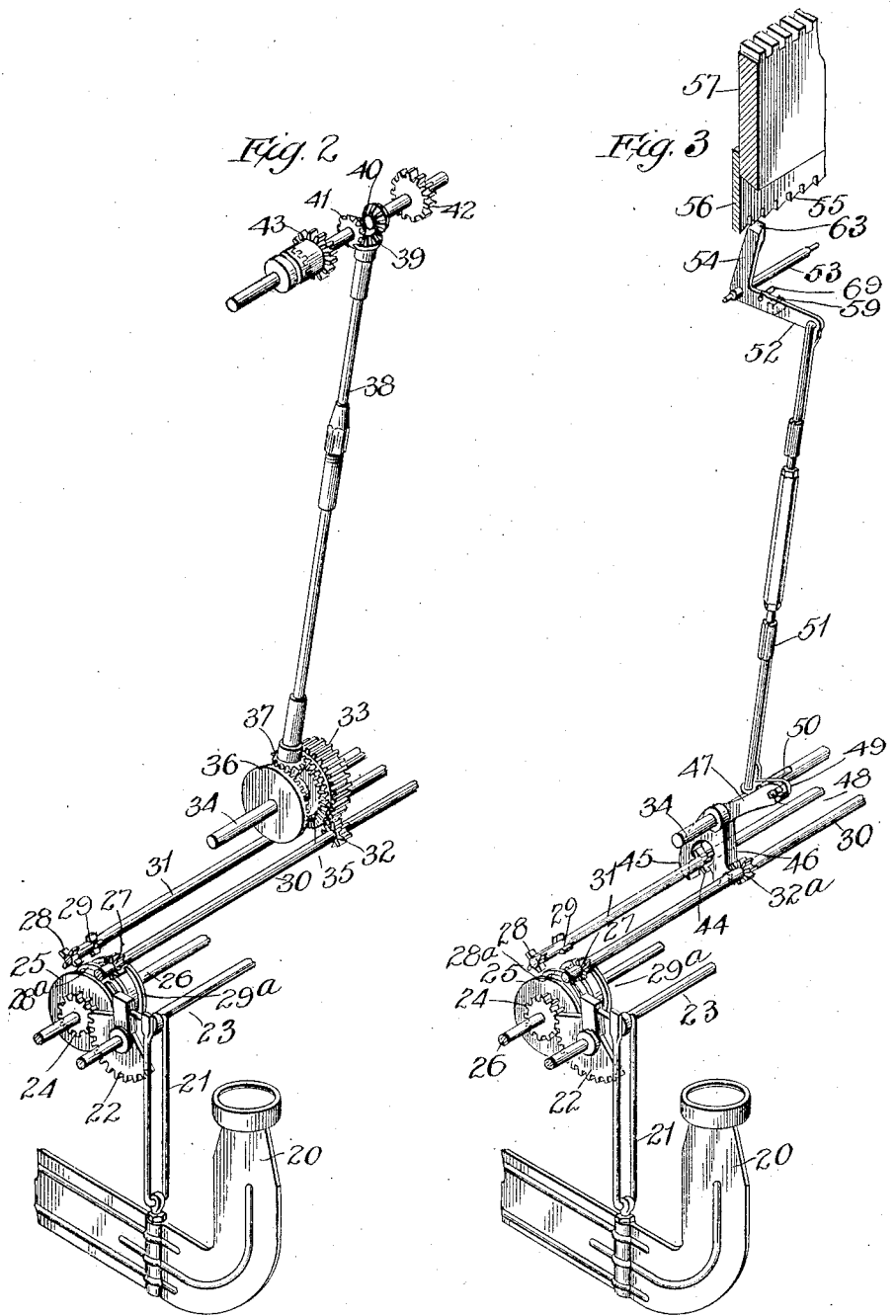

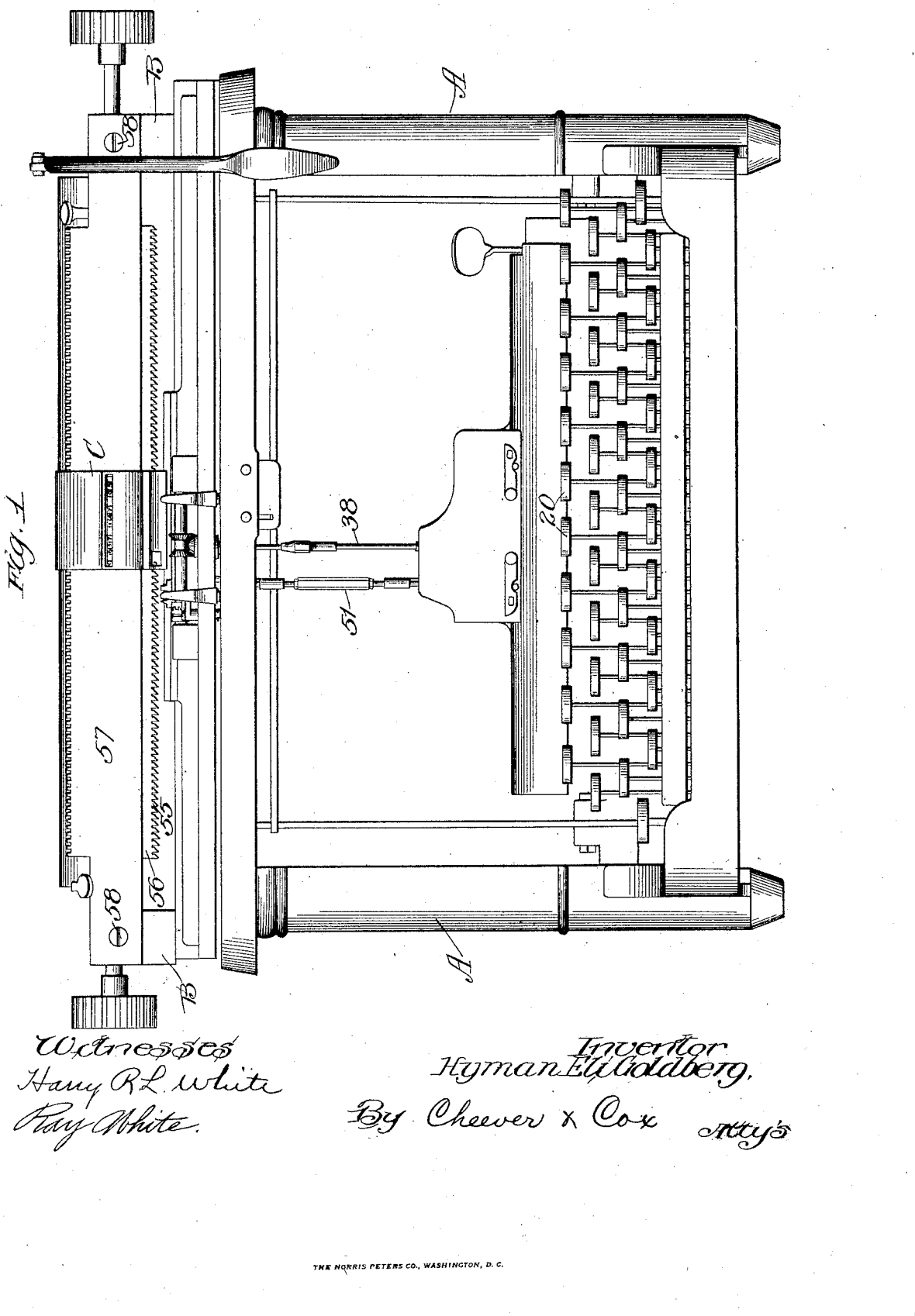

No. 881,572. PATENTED MAR. 10, 1908.
H. E. GOLDBERG.
CALCULATING MACHINE.
APPLICATION FILED JUNE 5, 1907.
4 SHEETS—SHEET 3.
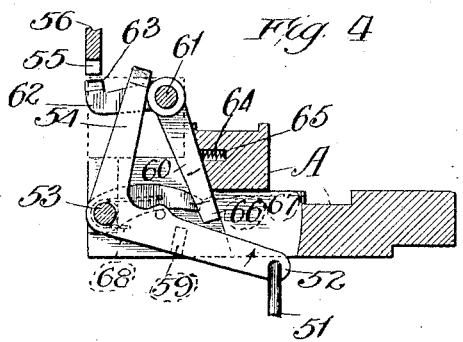
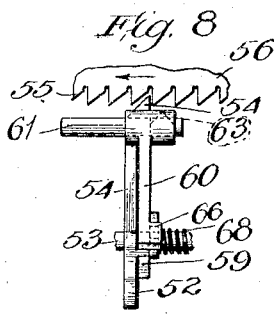
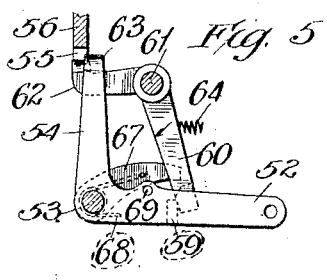
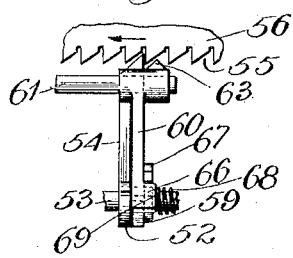
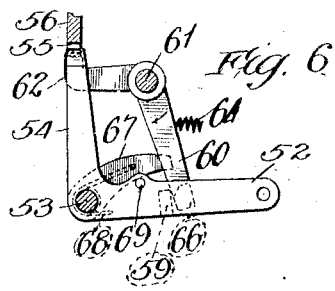
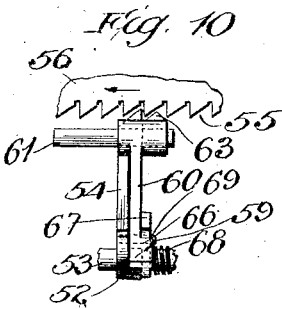
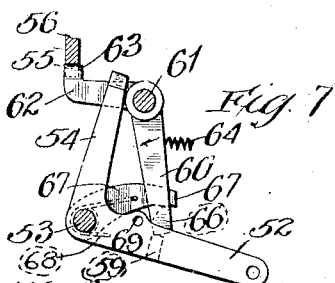
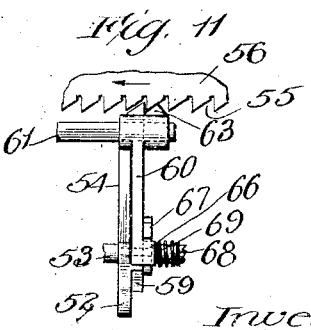
Witnesses
Harry R. L. White
Ray White
Inventor
Hyman Eli Goldberg
By Cheever & Cox Attys No. 881,572. PATENTED MAR. 10, 1908.
H. E. GOLDBERG.
CALCULATING MACHINE.
APPLICATION FILED JUNE 5, 1907.
4 SHEETS—SHEET 4.
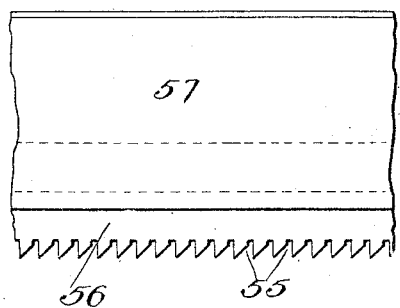
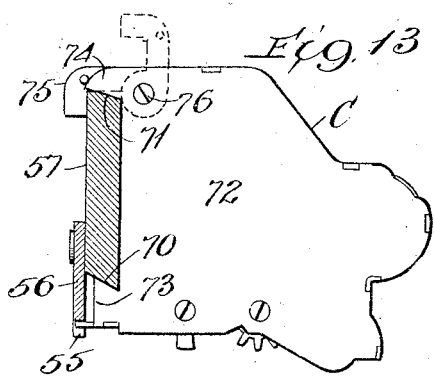
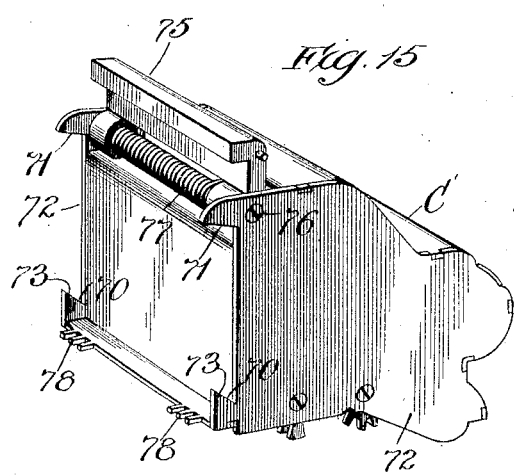
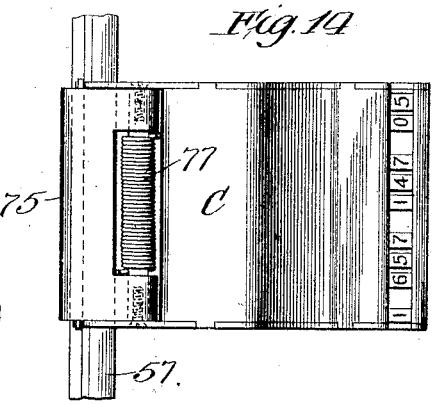
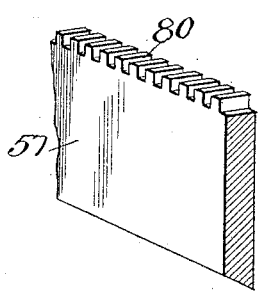
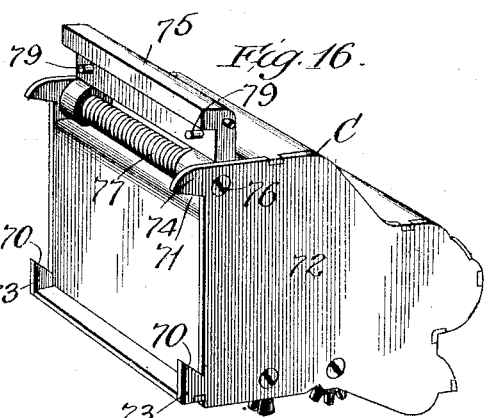
Witnesses
Harry R. L. White
Ray White
Inventor
Hyman E. Goldberg.
By Cheever & Cox
Attys
THE NORRIS PETERS CO., WASHINGTON, D. C.

UNITED STATES PATENT OFFICE.

HYMAN E. GOLDBERG, OF CHICAGO, ILLINOIS, ASSIGNOR TO GOLDBERG CALCULATING MACHINE COMPANY, A CORPORATION OF ILLINOIS.

CALCULATING-MACHINE.

No. 881,572.  Specification of Letters Patent.  Patented March 10, 1908.

Application filed June 5, 1907. Serial No. 377,379.

*To all whom it may concern:*

Be it known that I, HYMAN E. GOLDBERG, a citizen of the United States, residing at Chicago, in the county of Cook and State of Illinois, have invented a certain new and useful Improvement in Calculating-Machines, of which the following is a specification.

My invention relates to calculating machines including typewriter attachments, and one of the objects of the invention is to provide what may be termed an "anti-piling" device. In calculating machines and also in typewriters in which there is a traveling carriage it is necessary for the correct operation of the machine, that the carriage should escape between each complete key action. If in typewriters the carriage does not escape between each action of the key, one character will be printed upon top of the other. This is bad enough in typewriting but in performing calculations upon a calculating machine, it is fatal to the accuracy of the result, and one of the objects of my invention is to provide means whereby a second key can not be depressed until the carriage has properly escaped and traveled after the action of the next prior key. This prevents the "piling" of one letter or numerical character upon another and insures the traveling movement of the carriage between each two successive key strokes.

Another object of my invention is to provide improved means for detachably mounting the totalizer upon the part designed to support it. For various reasons, it is frequently desirable to shift the totalizer upon its supporting member; for example, it may be desired to shift the calculating point with reference to the recording or work sheet to bring the printed columns to different locations thereon, or, in case two or more totalizers are used it may be desirable to remove or attach one totalizer without disturbing any of the others. In this latter respect my present machine exhibits an improvement over the one shown in my previous patents Nos. 741,961 and 782,554, granted respectively on the 20th of October, 1903, and the 14th of February, 1905. In the construction there shown, the totalizer is mounted upon a supporting member in such manner that the totalizer in order to be moved had to be slipped off over the end of the bar upon which it was supported. In such construction if it were desired to remove a totalizer mounted between two other totalizers it would be necessary to remove one of the others before the desired one could be removed. This was a disadvantage both because the removing of the totalizer over the end of the bar was rather an awkward way to have to do it, also because time was wasted in taking off and replacing the extra totalizer and furthermore because the removal and replacement of the totalizer which was to remain gave rise to the possibility of an error in re-locating it upon the supporting bar.

In my present construction it is possible to remove a totalizer directly from its supporting member without disturbing any other totalizers if such be present.

The totalizer in its present form may be removed or replaced with great ease and despatch and when once adjusted is held with great rigidity, there being no possibility of its shifting unless some of the parts become actually broken.

Referring to the accompanying drawings which illustrate the mechanism by which I am enabled to carry out my invention and in which similar reference characters denote similar parts in the several views: Figure 1 is a general front view of a typewriter and calculating attachment embodying my invention. Fig. 2 is a perspective view of the differential mechanism. Fig. 3 is a perspective view similar to Fig. 2, except that it omits the upper portion of the differential mechanism, and instead shows the carriage lock which, in order to avoid confusion, is omitted in Fig. 2. However, in the form of machine which I have chosen to illustrate my invention, the parts represented in the upper portions of Figs. 2 and 3 are located side by side in proximity to each other as will be apparent by reference to Fig. 1. Fig. 3 is more particularly concerned with the elements which constitute the anti-piling device. Figs. 4 to 7 both inclusive are side views of the elements which chiefly compose the anti-piling device. The different views illustrate the interaction of the parts. Figs. 8 to 11 inclusive are front views of the parts shown in Figs. 4 to 7 inclusive. Fig. 12 is a front or face view of a fragment of the bar which supports the totalizer. The lower portion of the figure shows the rack which constitutes part of the carriage lock. Fig. 13 is a side view and Fig. 14 a plan view of the totalizer in position upon its supporting member. Figs. 15 and 16 are perspective views of the totalizer showing different constructions of the mechanism for preventing the shifting of the totalizer upon its supporting bar. Fig. 17 is a fragmentary perspective view showing the supporting member in the form best adapted for use in connection with the catch shown in Fig. 16.

*The anti-piling device.*—I will first describe the parts for operating the anti-piling device or means by which a second key is prevented from acting until the carriage has escaped as the result of the action of a previous key or of the spacing bar. This device is illustrated in Figs. 1 to 11 inclusive, and in the form shown is, briefly speaking, a stop which is automatically thrown back by the traveling movement of the carriage but which will prevent the action of a key if a movement of the carriage has not taken place since the action of the prior key.

My invention is applicable either to an independent machine or to a calculating attachment for typewriters and I have chosen the latter type of mechanism to illustrate the principle of the invention. In the particular form of typewriter shown, (which is a Remington (Fay) Sholes) the framework A is surmounted by a traveling carriage B after the manner common to many makes of typewriters now well known in the art and in common use. One or more totalizers C are mounted upon or connected to the carriage as will be hereinafter explained. These parts are best illustrated in Fig. 1.

The differential mechanism which I have selected for the purpose of illustrating the principle of the anti-piling device is practically identical with the corresponding parts shown in my prior patent 782,554, above referred to. In the present case therefore, a brief description of this part of the mechanism will be sufficient. The numeral key 20 is attached by means of a link 21 to a toothed driving sector 22 which is loosely mounted upon an axle 23 and remains permanently in mesh with the gear wheel 24 which preferably forms an integral part of the digit piece 25. Said digit piece is loosely mounted upon the stationary axle 26 and is adapted to operate upon the digit pinion 27 and locking pinions 28 and 29 in such manner as to impart a differential motion to the shaft 30 whereupon the pinion 27 is rigidly fastened and an intermittent rotary motion to the shaft 31 whereon the pinions 28 and 29 are rigidly fastened. In so far as the present invention is concerned, the pinion 27 and parts operated thereby are immaterial except for the purpose of indicating a complete operative structure. In the form of differential mechanism illustrated, the motion of shaft 30 is transmitted through the agency of a pinion 32 which is fixed upon said shaft and meshes with the gear wheel 33 on the stationary axle 34. Rigid with the wheel 33 are two bevel gears 35 and 36 (see Fig. 2) which are spaced at such distances apart that one or the other of them may be brought into mesh one at a time with the bevel pinion 37 depending upon the lateral position of said bevel gears upon said axle 34. Pinion 37 is secured to rod 38 which at its upper extremity is provided with a bevel pinion 39 adapted to mesh with gears 40 and 41 for driving the setting wheels 42 and 43 respectively.

Referring now to the parts more particularly concerned with the anti-piling device, the shaft 31 has an intermittent rotary motion as follows: When the key first commences its downward motion shaft 31 is rotated one eighth of a revolution: It then remains quiet until the key has reached a point somewhere near the lower end of its stroke whereupon said shaft is rotated another eighth of a revolution; it remains in this position until the key has completed its downward movement and also its upward movement to final rest position. This intermittent rotation of shaft 31 is accomplished by means of locking sectors 28ª and 29ª which constitute a part of the digit piece 25 in the manner fully described in the above mentioned patent 782,554. Upon the locking shaft 31 is secured a mutilated pinion 44 (see Fig. 3) which has a camlike action upon the lower extremity of the arm 45. Said arm is pivotally mounted upon the stationary axle 34 previously mentioned, and, owing to the peculiar intermittent action of the shaft 31 and pinion 44 thereon said arm 45 rotates a slight distance in a clockwise direction when the key commences its downward movement and remains in this position until the key has nearly completed its downward movement whereupon said arm is rotated slightly in an anti-clockwise direction and is returned to its original position where it remains until the key has returned to original position; consequently the action is such that the arm 45 oscillates back and forth during the downward movement of the key but remains still during the upward movement of the key. In the form of machine here illustrated the setting up or differential movement of the parts occurs entirely during the downward movement of the key and is completed by the time or before the key reaches its lowest position, but this characteristic is not essential. It may be said in passing that the arm 45 has a branch 46 provided with a point adapted to enter the pinion 32 on the digit shaft 30 for locking said shaft at all times except when it is positively moved by the action of the shaft 31 to permit the rotation of the pinion 32 and its enmeshed gearing. The branch 46 however, and its action upon the digit shaft 30 is immaterial so far as my present invention is concerned.

Rigidly connected with the arm 45 is an arm 47 which is forked at its outer extremity to engage the pin 48 extending laterally from the rocker arm 49. Said rocker arm is pivotally supported upon the axle 50 and is articulately connected at its end opposite to the pin 48 to the rod 51. Rod 51 is articulately connected at its upper extremity to an arm 52 which is pivotally mounted upon the axle 53. The parts are so proportioned and arranged that the oscillatory movement of the arms 45 and 46 about their axle 34 will produce an oscillatory movement of the arm 49 about the axle 50 and produce a reciprocatory movement of the rod 51. In this the preferred design of typewriter attachment, the arm 52 has a branch 54 extending upwardly so as to swing into and out of engagement with the teeth 55 formed upon the plate 56 secured to the bar 57. Said bar is adapted to support the totalizers and is secured to the typewriter carriage B by means of the screws 58 or other suitable devices; consequently bar 57 and the totalizers thereon travel in unison with the carriage. The function of the arm 54 is to insure the non movement of the carriage and totalizer during the setting up or calculating action of the differential mechanism. This it does by swinging into engagement with the teeth of the plate 56 before the period of rotation of the digit shaft 30, remaining in mesh during the period of rotation and swinging out of engagement after the rotary movement of shaft 30 is completed. Arm 54 and the parts associated therewith may therefore be considered as constituting a carriage lock, similar to the one described and claimed in my copending application filed May 28, 1904, Serial No. 210,158. I employ the arm 52 as part of the anti-piling device, but it will be understood that the arm 54 is not a necessary part so far as the anti-piling device is concerned. It is desirable but not essential that rod 51 and arm 52 should perform the double function of operating the carriage lock and the anti-piling device.

I will now refer to the parts which more particularly constitute the anti-piling device. These parts are illustrated in detail in Figs. 4 to 11 inclusive, and their construction and operation will be clearly understood when taken in connection with the parts shown in Fig. 3. The successive movements of the parts of the anti-piling device are illustrated in Figs. 4, 5, 6 and 7. Figs. 8, 9, 10 and 11 are front views of the parts shown in Figs. 4, 5, 6 and 7, respectively. A lug 59 projects from the side of arm 52 and is adapted under certain conditions (see Fig. 7) to engage the lower end of the arm or stop 60. Arm 60 is pivotally mounted upon the shaft 61 and an arm 62 is rigidly connected to arm 60 and consequently moves in unison therewith. The upper extremity of arm 62 has a beveled tooth 63 adapted to enter between the teeth 55 of the plate 56. The parts are so constructed that the tooth 63 tends to remain in engagement with the teeth 55. This tendency may be produced either by properly balancing the arms 60 and 62 or by providing a compression spring 64 arranged in a chamber 65 in the stationary typewriter framework A in position to act upon the back of arm 60. This construction is best illustrated in Fig. 4. The tooth 63 will remain in the path of the teeth 55 except when forced out by the teeth themselves. This forcing out or ejection results from the traveling movement of the plate 56 moving in unison with the typewriter carriage and totalizer; consequently a lateral or traveling movement of the carriage will move arms 62 and 60 in an anti-clockwise direction (the parts being viewed as in Figs. 4 to 7). The constant tendency however, is for the arms 62 and 60 to move in a clockwise direction and assume the position shown in Fig. 7. Extending laterally from the arm 60 is a lug 66 adapted to contact the pawl 67 which is pivotally supported upon the shaft 53. A spring 68 is constructed in such manner as to urge pawl 67 in a clockwise direction. The pin 69 extending laterally from the arm 59 is adapted to contact the lower edge of pawl 67 and lift it clear of the lug 66.

The anti-piling device operates as follows: When the parts are all in normal position (shown in Figs. 4 and 8) the arm 52 will be down and the pawl 67 will engage the lug 66 on the arm 60 to hold said arm out of the path of the lug 59. If, now, the connected figure key be depressed, arm 52 will rise (incidentally throwing arm 54 into engagement with the teeth 55 on plate 56 and consequently preventing the travel of the latter). The rise of arm 52 and pin 69 thereon will lift pawl 67 and permit the spring 64 to move arm 60 until it is arrested by the lug 59 as shown, in Figs. 5 and 9. The parts continue to move until they reach their extreme positions shown in Figs. 6 and 10, the lug 59 and arm 60, sliding on each other. The tooth 63 will now lie between but not yet abutting the points of the teeth 55 upon plate 56 as shown. As the key continues its movement the arm 52 will be lowered to original position as shown in Figs. 7 and 11. The lug 59 will therefore be lowered out of contact with the arm 60, and the spring 64 will cause arm 60 to move a little farther in a clockwise direction until the lower end of said arm is directly above the lug 59. The tooth 63 thus moves still farther into the space between the teeth 55. It is obvious that arm 52 cannot rise again and consequently the key cannot make another stroke until arm 60 has been thrown back so as to release the lug 59. The means shown for thus throwing back arm 60 is the plate 56 whose teeth 55 act upon the bevel surface of the tooth 63 and force the latter downwards. The resulting withdrawal of arm 60 not only releases the lug 59 but permits pawl 67 to drop down into position to reëngage lug 66.

It will be noted more particularly by reference to Fig. 7 that the pawl 67 is prevented by the lug 66 from dropping down prematurely, and prematurely engaging said lug. It will be seen therefore that the anti-piling device does not interfere with the action of the keys so long as a lateral movement of the carriage intervenes between each two key strokes. If, however, an attempt is made to operate the key twice before the carriage has completely escaped, the arm 60 will effectually prevent a second movement of the key. As the tooth 63 is beveled on both sides, the carriage may move freely on either direction, the teeth 55 merely slipping over said tooth 63. If it should be desired to print or calculate the same character again in the same column at a point above or below, this may be done either by depressing the arm 62 by hand, or by moving the carriage laterally in one direction or the other to release said arm and then replacing said carriage.

It will be noticed that the lug 66 is beveled at the point where the pawl 67 contacts it as shown in Fig. 4. The action of the spring 68 upon pawl 67 thus results in forcing lug 66, arm 60 and tooth 63 a little further than the lateral motion of the carriage would move them. The tooth 63 is therefore normally held completely away and free from the teeth 55 and friction is thereby avoided.

It will be understood that the anti-piling device may be employed with various types of key actions and differential mechanism. It is merely necessary that the arm 60, which constitutes a stop for the keys shall act upon a part which when held will hold the key to prevent depression thereof.

*The totalizer mounting.*—I will now describe the improved means whereby the totalizer is detachably attached to its supporting member. This phase of the invention is illustrated in Figs. 12 to 17 inclusive taken in connection with the general view Fig. 1. The bar 57 previously mentioned which travels in unison with the carriage and supports the totalizer C has a preferably beveled lower edge 70. The upper edge 71 of said bar is so formed that when the extensions 73 of the totalizer walls 72 are adjusted to the lower edge of said bar, the extensions 74 of said wall may be brought into position over the upper edge of said bar, as shown in Fig. 13. Although I have shown the upper and lower edges of bar 57 beveled, this feature is not essential, the idea being chiefly that the totalizer fits the bar rather snugly and by preference is so constructed that when a supplemental fastening is applied to one edge of the bar all relative movements between the bar and the totalizer in a plane transverse to the length of the bar will be effectually prevented. I supply this supplemental fastening device preferably in the form of a catch 75 which in the present instance is hinged upon a rod 76 extending from one totalizer wall to the other. Preferably said catch is L shaped to fit over the edge of bar 57 as for example in Fig. 13. It will be seen that when said catch is in engagement with said bar the totalizer is effectually prevented from moving transversely to said bar. The construction is such that said catch may be readily raised by the operator as for example to the position shown in Fig. 15. By preference the said catch is urged to closed position (shown in full lines Figs. 13 and 14) by means of a spring 77.

To now consider the means for preventing movement of the totalizer lengthwise of the bar 57; this may be accomplished in various ways among which I have illustrated two. In the form shown in Figs. 13, 14 and 15 the totalizer is provided with pins 78 adapted to enter between the teeth 55 on the plate 56. In the form shown in Fig. 16 the catch itself is provided with pins 79 adapted to engage teeth 80 which may be formed on the upper edge of bar 57. It will be seen that with either of the constructions noted, the totalizer may be attached to bar 57 by merely placing it directly upon the bar in the position desired and permitting the catch 75 to be lowered over the edge of bar 57. The pins 78 or 79 will readily enter between the teeth designed for them and will effectually prevent sliding movement along bar 57. It will be understood of course that the plate 56 and bar 57 may be constructed of a single piece of metal and may be made to assume a variety of forms without departing from the spirit of the invention. It will also be undestood that the location and form of the pins 78 and 79 may be varied and that the manner of mounting bar 57 upon the carriage may also be varied. If the means shown in Figs. 16 and 17 for preventing a lateral movement of the totalizer upon bar 57 are employed the plate 56 may be entirely omitted in so far as the totalizer support is concerned.

Although I have shown my invention embodied in a calculating machine having the form of a typewriter attachment it will be apparent that the principles of construction and operation are the same as in an independent machine. The combined typewriter and calculator is practically nothing more than a recording calculating machine provided with letter characters.

In the design illustrated the totalizer is mounted directly upon the typewriter carriage or at least upon a supporting member directly mounted upon the typewriter carriage. This is desirable for compactness, simplicity and other reasons, but it is clear that the principles of the mechanism would be in no wise altered if the totatlizer and paper platen were mounted on separate carriages adapted to move in unison.

Certain devices and combinations of devices shown in the accompanying drawings and mentioned in this specification, for example the plurality of setting wheels and the carriage lock whereby premature escapement of the carriage is prevented, are shown, described, and claimed in my prior application, filed May 28, 1904, Serial No. 210,158. They are, therefore, not claimed in the present application.

What I claim as new and desire to secure by Letters Patent, is:

1. In a calculating machine, a totalizer having indicating members for indicating the various decimal denominations, operating mechanism for operating said indicating members one at a time, a carriage for determining the denominational place of operation of the operating mechanism upon the indicating members and means for preventing two successive operations upon the same indicating member without intervening motion of said carriage, said preventing means being restorable to permissive condition by the motion of the carriage.

2. In combination, a calculating machine having keys and a traveling denomination carriage, and means for preventing two successive calculations in the same denominational column, said preventing means being restorable to permissive conditions by the motion of the carriage.

3. In combination with a calculating machine having keys and a traveling carriage, a stop adapted to prevent depression of a key, and means operated by the carriage for throwing said stop to non active position.

4. In combination with a calculating machine having keys and a traveling carriage, a stop adapted to prevent depression of a key, and a cam device operated by said carriage during its traveling movement for throwing said stop to non active position.

5. In combination with a calculating machine having keys and a traveling carriage, means for preventing two successive movements of a key without an intervening movement of the carriage, said preventing means being capable of being put into active and non active position, said preventing means being put into active position by the keys and into non active position by the travel of the carriage.

6. In combination with a calculating machine having keys and a traveling carriage, a stop 60 for preventing two successive key movements without an intervening movement of the carriage, said stop being adapted to be set to active holding position by the keys, and being adapted to be moved to non active position by the carriage.

7. In combination with a calculating machine having keys and a traveling carriage, a stop adapted to prevent depression of a key, a rack moving in unison with said carriage and a cam connected to said stop for moving it to non active position, said cam being adapted to be operated by the teeth of said rack.

8. In combination with a calculating machine having figure keys and a traveling carriage, means for preventing two successive key movements without an intervening movement of the carriage, said preventing means comprising a member operated by the keys, a stop adapted to prevent the motion of said key operated member for preventing the downward movement of the keys, and means moving in unison with the carriage for releasing said key-operated member.

9. In a calculating machine the combination with the keys and traveling carriage of a stop adapted to prevent the depression of a key, a pawl for normally retaining said stop in non active position, means operated by the key for releasing said pawl to thereby release said stop from non active position, and means actuated by the carriage for resetting said stop to non active position.

10. In a calculating machine the combination with the keys and traveling carriage of a stop adapted to prevent the depression of a key, said stop being spring influenced to move to active position, a pawl 67 for normally retaining said stop in non active position, means actuated by the key for lifting said pawl to thereby release said dog and permit it to assume its active position to prevent another downward movement of the key and a cam device part of which moves in unison with the carriage for resetting said stop in non active position.

11. In a calculating machine a totalizer, a prismatic bar for supporting the same and a catch mounted on said totalizer and adapted to close on said bar for holding the totalizer thereon and adapted to open sufficiently to clear said bar for permitting said totalizer to be withdrawn from said bar transversely thereof.

12. In a calculating machine, the combination of a totalizer, a prismatic bar for supporting the same and means for detachably fastening said totalizer to said bar, said fastening means being movably connected to said totalizer, and adapted to open and close for attachment and detachment of the totalizer, said fastening means when open being capable of completely clearing said bar to permit the totalizer to be taken therefrom in a direction at right angles thereto.

13. In a calculating machine, the combination of a totalizer, a totalizer support and a hand releasable catch adapted to engage said support for detachably holding said totalizer thereon.

14. In a calculating machine, the combination of a totalizer, a bar for supporting the same, said totalizer having means thereon for engaging one edge of said bar, and an L shaped catch hinged to said totalizer and adapted to engage the opposite edge of said bar, said catch being adapted to be swung clear of the edge of said bar whereby the totalizer may be removed from said bar in a direction transverse to the length thereof.

15. In a calculating machine the combination of a totalizer, a bar for supporting said totalizer, projections on said totalizer adapted to engage the edges of said bar and means supplementary to said projections for assisting the same in holding the totalizer upon said bar.

16. In a calculating machine the combination of a totalizer, a bar for supporting said totalizer, projections on said totalizer adapted to engage the edges of said bar and means supplementary to said projections for assisting the same in holding the totalizer upon said bar, said supplementary holding means being spring urged to closed position and being hand releasable, for the purpose described.

17. In a calculating machine the combination of a totalizer, a totalizer support, means movably connected to the totalizer and adapted to engage said support for holding the totalizer thereon and additional means for preventing lateral movement of said totalizer upon its support.

18. In a calculating machine the combination of a totalizer, a bar for supporting said totalizer, a catch for holding said totalizer upon said bar, said catch being hand releasable whereby the totalizer may be removed directly from the face of said bar and means for preventing movement of said totalizer upon said bar.

19. In a calculating machine and combination of a totalizer, a flat bar for supporting the same, projections on said totalizer adapted to engage the edges of said bar and a catch mounted on said totalizer, and adapted to engage said bar for supplementing the holding action of said extensions and removably retaining the totalizer upon said bar and pins for preventing longitudinal movement of said totalizer upon said bar.

20. In a calculating machine the combination with the keys, stationary framework, and a carriage traveling on said framework of a totalizer, a bar adapted to support said totalizer, and hand releasable holding means adapted to engage the edges of said bar substantially as described.

In witness whereof, I have hereunto subscribed my name in the presence of two witnesses.

HYMAN E. GOLDBERG.

Witnesses:
HOWARD M. COX,
C. J. CHRISTOFFEL.